United States Patent
Nuggehalli

(10) Patent No.: US 9,148,548 B2
(45) Date of Patent: Sep. 29, 2015

(54) CARD AUTHENTICATION FOR OAUTH SUPPORTED CLOUD SERVICES ON A MULTI-FUNCTION DEVICE

(71) Applicant: Jayasimha Nuggehalli, Cupertino, CA (US)

(72) Inventor: Jayasimha Nuggehalli, Cupertino, CA (US)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 14/638,814

(22) Filed: Mar. 4, 2015

(65) Prior Publication Data

US 2015/0181080 A1 Jun. 25, 2015

Related U.S. Application Data

(63) Continuation of application No. 14/081,818, filed on Nov. 15, 2013, now Pat. No. 9,001,370.

(51) Int. Cl.
*G06K 15/02* (2006.01)
*H04N 1/44* (2006.01)
*H04N 1/00* (2006.01)

(52) U.S. Cl.
CPC .......... *H04N 1/4426* (2013.01); *H04N 1/00244* (2013.01); *H04N 1/00334* (2013.01); *H04N 1/4413* (2013.01); *H04N 2201/0094* (2013.01)

(58) Field of Classification Search
CPC .................................................. H04N 1/4426
See application file for complete search history.

(56) References Cited

U.S. PATENT DOCUMENTS

| | | | |
|---|---|---|---|
| 2009/0251724 A1* | 10/2009 | Nakajima | 358/1.15 |
| 2011/0001999 A1* | 1/2011 | Nanaumi | 358/1.14 |
| 2011/0145906 A1 | 6/2011 | Morita et al. | |
| 2012/0117629 A1 | 5/2012 | Miyazawa et al. | |
| 2013/0060889 A1 | 3/2013 | Miyazawa | |
| 2013/0135640 A1* | 5/2013 | Nagasaki | 358/1.11 |
| 2013/0188212 A1* | 7/2013 | Pardhan et al. | 358/1.14 |
| 2014/0002836 A1* | 1/2014 | Ishino et al. | 358/1.13 |
| 2014/0118780 A1* | 5/2014 | Kimura | 358/1.15 |
| 2014/0355034 A1* | 12/2014 | Mihara | 358/1.14 |

OTHER PUBLICATIONS

European Patent Office, "Search Report" in application No. 14192588.3-1870, dated Mar. 30, 2015, 7 pages.

* cited by examiner

*Primary Examiner* — Qian Yang
(74) *Attorney, Agent, or Firm* — Hickman Palermo Becker Bingham LLP

(57) ABSTRACT

Techniques are described for providing an MFP device with access to external Web services. According to embodiments, an MFP Web application receives a registration request to register a particular user of an MFP with the MFP Web application. The MFP peripheral Web application uses at least one external Web service. In response to receiving the registration request, the MFP Web application performs at least one of sending to an email address associated with the particular user an email that includes a registration code and a link to the MFP Web application or sending to the MFP the registration code and encoded data including a link to the MFP Web application. After receiving an access token and the registration code, mapping data is stored at the MFP Web application that maps MFP device user identification data for the particular user to the access token for accessing the external Web service.

20 Claims, 16 Drawing Sheets

CARD AUTHENTICATION FOR OAUTH SUPPORTED CLOUD SERVICES ON A MULTI-FUNCTION DEVICE

CLAIM OF PRIORITY

The present application claims the benefit as a continuation of U.S. patent application Ser. No. 14/081,818, which is titled "CARD AUTHENTICATION FOR OAUTH SUPPORTED CLOUD SERVICES ON MULTI-FUNCTION DEVICE", filed Nov. 15, 2013, the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present disclosure relates to authenticating users of a multi-function peripheral device, and, more specifically, to securely authorizing a Web application associated with a multi-function peripheral device to access an external cloud service.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Some multi-function peripherals (MFPs) include sophisticated computing platforms that support built-in applications and services, such as printing, scanning, faxing, etc., as well as access to Web applications and/or Web services. In order to access Web-based services via the MFP, a user may be required to input authentication credentials, such as a user identifier (ID) and password pair, through a control panel on the MFP. These authentication credentials may vary for each Web service that a user may wish to access. For example, the user may use a particular user ID and password for one Web service, and a different user ID and/or password for another Web service. Entering such credentials each time a user wishes to access these services via an MFP may be a cumbersome and time-consuming process. In addition, the user may not trust the security of third-party MFPs to store or access authentication credentials for external cloud services.

OAuth is a protocol that allows applications developed by third-parties to access a service consumer's account. Within the OAuth workflow, the consumer/user is redirected from a third-party application to an authentication endpoint for the cloud service, where the user provides authentication credentials and authorizes access by the third-party application. This process enables the third-party application to access the Web service without requiring the user to share their authentication credentials with the third-party application. The OAuth protocol can be challenging for some MFPs, which may only support limited-capability browsers or embedded applications for connecting to Web services. For example, the MFP's browser may not be able to connect directly to external Web services, browse the World Wide Web and/or fully support authorization protocols such as OAuth.

SUMMARY

Techniques are described for providing an MFP device with access to one or more external Web services. According to some embodiments, an MFP Web application receives, from an MFP, a registration request to register a particular user of the MFP with the MFP Web application. The MFP peripheral Web application uses at least one external Web service. In response to receiving the registration request, the MFP Web application performs at least one of generating and sending to an email address associated with the particular user an email that includes both a registration code and a link to the MFP Web application or sending to the MFP both the registration code and encoded data that includes the link to the MFP Web application. The MFP Web application redirects a request, received form a device separate than the MFP, to the external Web service to authenticate the particular user with the external Web service. An access token is received at the MFP Web application from the external Web service upon successful authentication of the particular user. The MFP Web application receives the registration code from the device separate from the MFP device. After receiving, at the MFP Web application, the access token and the registration code, mapping data is stored that maps MFP device user identification data for the particular user to the access token for accessing the external Web service.

BRIEF DESCRIPTION OF THE DRAWINGS

The present disclosure is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Various aspects of the invention are described hereinafter in the following sections:

I. Overview
II. System Architecture
III. Registration of External Web/Cloud Services
  A. Registration Workflow Overview
  B. Example MFP Interface for Registering MFP users
  C. Registration via Email
  D. Registration via Encoded Link
  E. Browser Redirection and Access Authorization
  F. Registration Code Processing and Access Token Mapping
  G. Example Message Ladder Diagram
IV. Secure Access of External Web/Cloud Services
  A. Example MFP Interface for Using MFP Web Applications
  B. Integration of RFID and other Smartcards
V. Implementation Mechanisms I. Overview Techniques are described for providing an MFP device with access to one or more external Web services. According to some embodiments, an MFP Web application receives, from an MFP, a registration request to register a particular user of the MFP with the MFP Web application. The MFP peripheral Web application uses at least one external Web service. In response to receiving the registration request, the MFP Web application performs at least one of generating and sending to an email address associated with the particular user an email that includes both a registration code and a link to the MFP Web application or sending to the MFP both the registration code and encoded data that includes the link to the MFP Web application. The MFP Web application redirects a request, received form a device separate than the MFP, to the external Web service to authenticate the particular user with the external Web service. An access token is received at the MFP Web application from the external Web service upon successful authentication of the particular user. The MFP Web application receives the registration code from the device separate from the MFP device. After receiving, at the MFP Web application, the access token and the registration code, mapping data is stored that maps MFP device user identification data for the particular user to the access token for accessing the external Web service.

II. System Architecture

Figure 1:
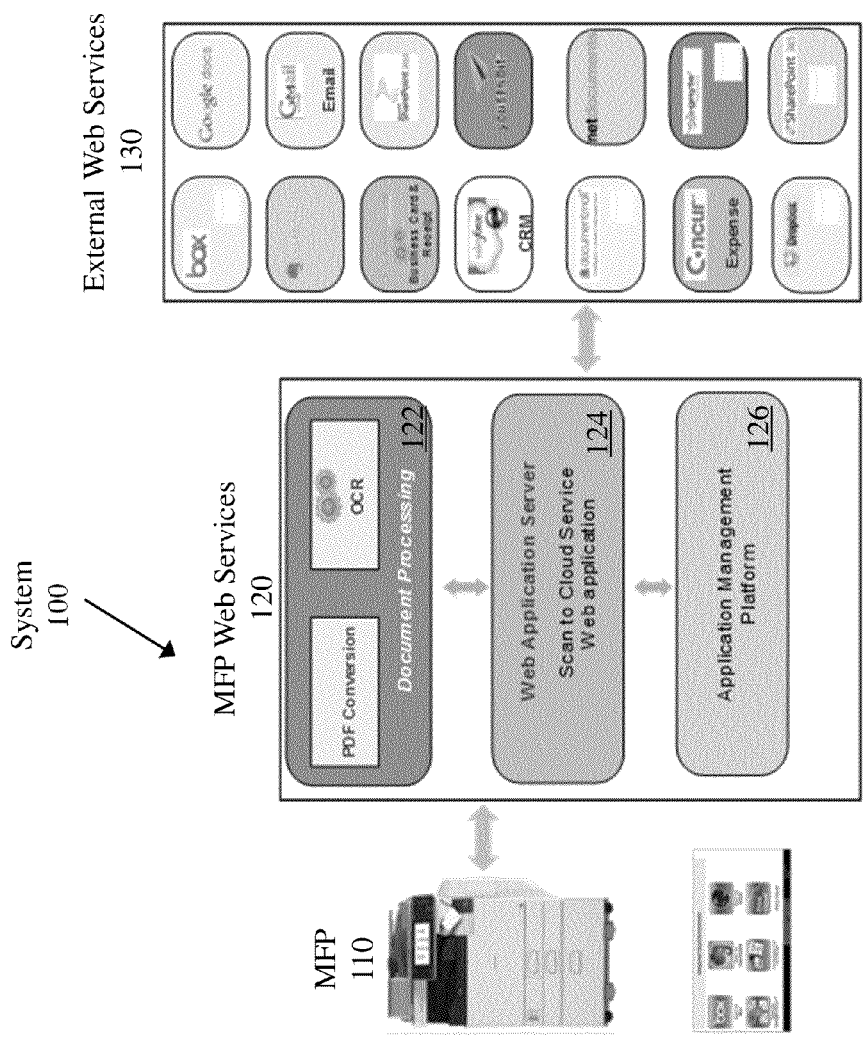
FIG. 1 is a block diagram that depicts an example system architecture for providing a multi-function peripheral device with access to one or more external Web services, according to an embodiment.

FIG. 1 is a block diagram that depicts an example system architecture for providing a multi-function peripheral device with access to one or more external Web services, according to an embodiment. System 100 includes MFP 110, MFP Web services 120, and external Web services 130, which may be communicatively coupled via one or more data communications networks. Example data communications networks may include, without limitation, one or more local area networks (LANs), wide area networks (WANs), and other computer networks of the Internet.

MFP 110 is a device that performs a set of specialized functions that may include, without limitation, any combination of one or more of printing, copying, sending and receiving facsimiles, scanning, etc. MFP 110 includes a user interface (UI) for receiving input from and generating output for users of the MFP 110. The UI may include, without limitation, a control panel, a display panel, a touchscreen, one or more physical buttons, etc. At least a portion of the UI may be received by MFP 110 from MFP Web services 120. For example, MFP 110 may receive, without limitation, graphical UI (GUI) data for display to the end user. In addition or alternatively, the UI may include a card reader, such as a radio frequency identifier (RFID) card reader or other smartcard reader, for receiving a card identifier, MFP authentication credentials and/or other MFP user identification data from an MFP user. MFP 110 may comprise a browser for interacting with MFP Web services 120. MFP users may access the browser, using the UI, to navigate and connect with MFP Web services 120 and external Web services 130. The browser on MFP 110 may be a limited-capability browser that does not comply with one or more Web standards. For example, the browser may not fully support one or more authorization protocol standards, such as the OAuth protocol and/or be able to fully browse the World Wide Web.

MFP Web services 120 interact with the browser on MFP 110 to provide a set of one ore more functions for MFP 110. MFP Web services 120 may reside on a cloud platform, the architecture of which may vary from implementation to implementation. For example, MFP Web services 120 may be implemented by one or more print servers and/or one or more Web servers executing on one or more network devices. MFP Web services 120 generally comprise document processing logic 122, Web application server 124, and application management platform 126.

Document processing logic 122 performs a set of one or more processing functions with respect to document data received from MFP 110 or from other network devices. Example functions may include, without limitation, performing optical character recognition (OCR) for scanned image data generated by MFP 110, generating print data (e.g., page description language data (PDL), printer management language (PML) data etc.) for MFP 110, and formatting and/or otherwise manipulating document data. Document data, as used herein, refers to data representing any portion of an electronic document. The format of the data may vary from implementation to implementation depending on the format of the document. For example, the document data may include, without limitation, data for an image file, word processor file, spreadsheet file, portable document format (PDF) file etc.

Web application server 124 provides an interface through which MFP 110 may access external Web services 130. Web application server 124 may include one or more MFP Web applications that communicate with the browser on MFP 110 and connect with external Web services 130 according to techniques described further herein. Each MFP Web application may perform a particular function or set of functions and corresponds to one or more external Web services. Example functions that may be performed by an MFP Web application includes, without limitation, sending document data received from MFP 110 to a corresponding external Web service, storing document data received from MFP 110 to a corresponding external Web service, performing document processing functions using document processing logic 122 for an external Web service and/or MFP 110, sending document or print data received from an external Web service to MFP 110 etc. There may be a one-to-one mapping between the MFP Web applications and the external Web services or a one-to-many mapping, depending on the particular implementation. For example, there may be different MFP Web applications for accessing email services, cloud storage services, expense reporting services, etc. In addition or alternatively, a single MFP Web application may be used to access any combination of these services. The MFP Web applications may also be referred to herein as connector applications as MFP 110 may connect to external Web services 130 through MFP Web applications executing on Web application server 124 as described in further detail herein.

Application management platform 126 maintains management data for interacting with external Web services 130. In an example embodiment, application management platform 126 may maintain a list of external Web services that are hosted by MFP Web services 120 and for which Web application server 124 is configured to access. In another embodiment, application management platform 126 may maintain UI data, such as icons or other GUI data, for each of the MFP Web applications and/or external Web services hosted by MFP Web services 120. The UI data may be sent to MFP 110 to allow MFP users to navigate and access MFP Web applications and/or external Web services 130. For example, icon data may be sent for each external Web service that is hosted by MFP Web services 120. MFP 110 then displays the icons on a touchscreen or other display panel coupled to MFP 110. In order to access an external Web service, a user of MFP 110 may select the corresponding Web service using the UI data (e.g., by touching a corresponding icon for the external Web service using the touchscreen interface).

External Web services 130 are a set of one or more Web/cloud services provided by a set of one or more service providers different than the provider of MFP Web services 120. External Web services 130 may comprise one or more processes implemented on a cloud platform. The architecture of the cloud platform may vary from service to service and/or from service provider to service provider. External Web services 130 may correspond to a variety of different services including, without limitation, email services such as Gmail and Yahoo! Mail, cloud storage services such as Google docs and Dropbox, expense reporting services such as Concur and Shoeboxed, database cloud services such as Amazon S3 and Oracle Cloud, and other Software-as-a-Service (SaaS), Platform-as-a-Service (PaaS) and Infrastructure-as-a-Service (IaaS) offerings.

III. Registration of External Web/Cloud Services

According to embodiments described herein, an MFP user registers with an MFP Web application to securely access one or more corresponding external Web services used by the MFP Web application to provide service to the MFP user. The registration process allows the MFP user to access the external Web service from MFP 110 without revealing the user's authentication credentials for the corresponding external Web service(s) to MFP 110 or the corresponding MFP Web application. Example embodiments of the registration process are given herein with respect to FIGS. 2-11.

A. Registration Workflow Overview

Figure 2:
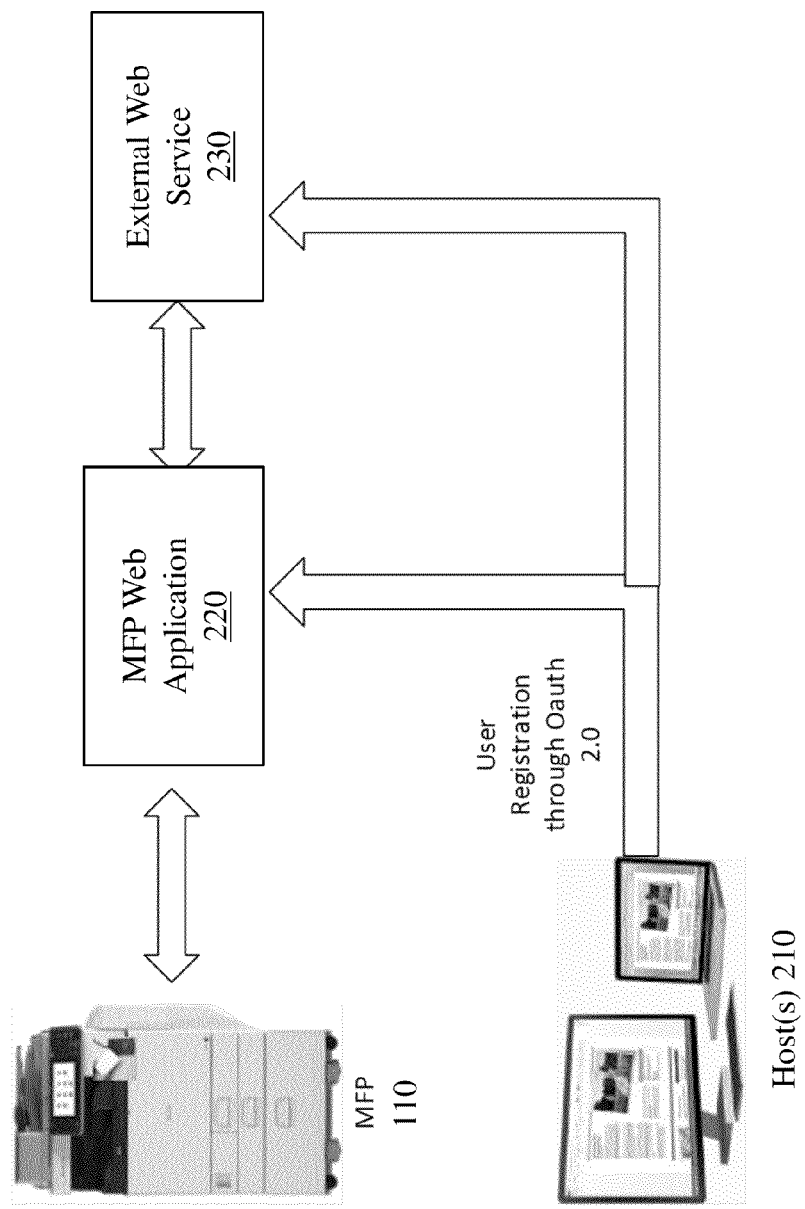
FIG. 2 is a block diagram that depicts an example registration workflow overview for registering an MFP user with an MFP Web application for accessing an external Web service, according to an embodiment.

FIG. 2 is a block diagram that depicts an example registration workflow overview for registering an MFP user with an MFP Web application for accessing an external Web service, according to an embodiment. The registration process begins at MFP 110. Using the UI of MFP 110, the MFP user requests access to MFP Web application 220, which uses external Web service 230. In response, MFP 110 generates and sends an access request to MFP Web application 220. MFP Web application 220 determines whether the MFP user is registered with MFP Web application 220. If the MFP user is not registered, then MFP Web application 220 may perform at least one of: generating and sending an email that may be used to complete the registration process; and generating a physical printout or otherwise displaying encoded data that may be used to complete the registration process. If the MFP user is already registered, then MFP Web application 220 may access external Web service 230 as described in more detail in the next section.

After the email and/or encoded data have been sent, the MFP user may use one of host devices 210 to complete the registration process. Host devices 210 are network hosts that are communicatively coupled to MFP Web application 220 and one or more external Web services, such as external Web service 230, via one or more data communications networks. Example host devices 210 may include, without limitation, desktop computers, laptops, mobile devices such as smartphones and tablets, and other computing devices that implement at least a subset of the communications protocols of the Internet Protocol (IP) suite. Host devices 210 may include a Web browser that is more robust than the browser on MFP 110. For example, host devices 210 may include Web browsers that support authorization standards not supported by the limited-capability browser on MFP 110. Example authorization standards may include, without limitation, OAuth, OpenID, and Security Assertion Markup Language (SAML). During the registration process, host devices 210 may use at least one authorization standard to authorize MFP Web application 220 to access one or more external Web services, such as external Web service 230, without providing or otherwise revealing to MFP Web application 220 authentication credentials for logging in to the one or more external Web services. Example steps of the registration process are described in more detail below with respect to FIGS. 3-11.

B. Example MFP Interface for Registering MFP Users

In order to start the registration process, an MFP user selects an MFP Web application that the MFP user would like to access. For example, the MFP user may touch or otherwise select the corresponding icon of an MFP Web application using the UI of MFP 110. If the MFP user has not previously registered to use the MFP Web application, then the MFP 110 may prompt the user to enter registration information. Example registration information that the user may enter may include, without limitation, an email address, an MFP user identifier, a card identifier, and/or other identification data that may be used to uniquely identify a particular MFP user.

Figure 3:
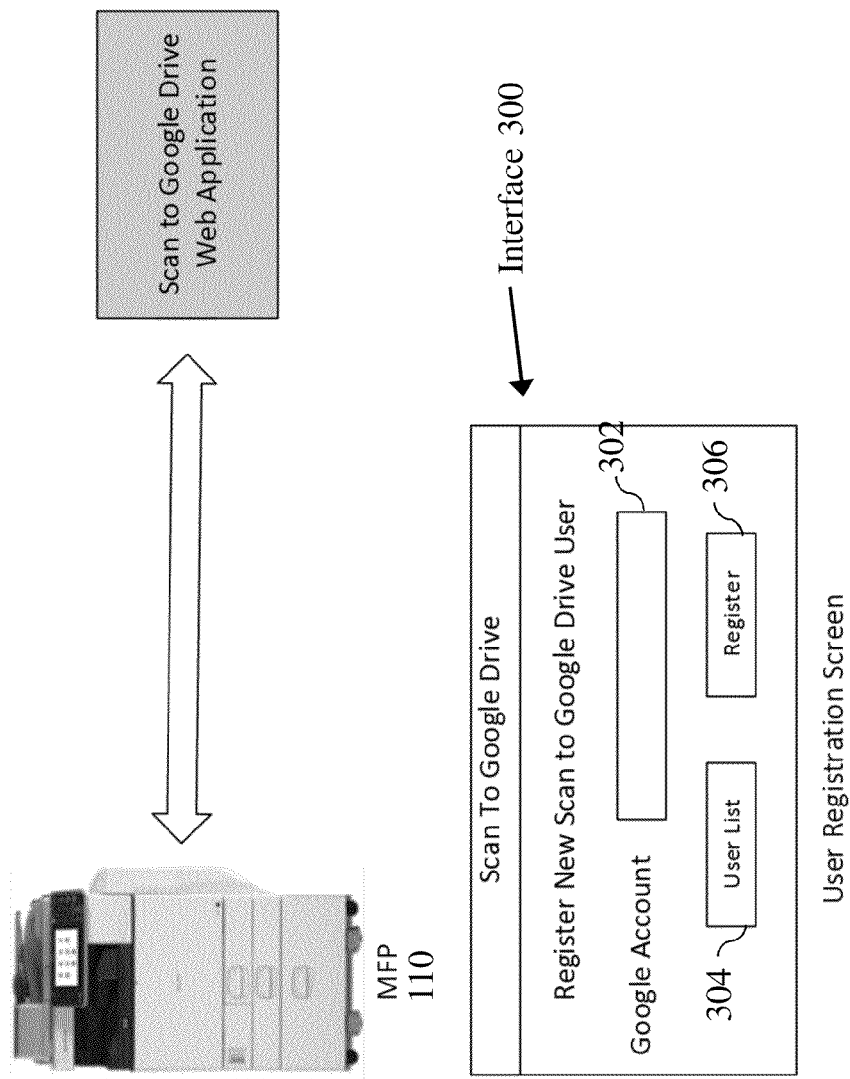
FIG. 3 is a block diagram that depicts an example MFP interface for receiving registration information from a user, according to an embodiment.

FIG. 3 is a block diagram that depicts an example MFP interface for receiving registration information from a user, according to an embodiment. In an embodiment, interface 300 is generated from UI data sent to MFP 110 by MFP Web application 220. in response to receiving a request to access MFP Web application 220 from an unidentified MFP user or from an MFP user that is not registered with MFP Web application 220. Alternatively, interface 300 may be generated and displayed by MFP 110 without communicating with MFP Web application 220. Interface 300 may be displayed on a touchscreen or other display panel of MFP 110. Interface 300 includes entry field 302, user list button 304, and register button 306. During registration, an MFP user may input an email address into entry field 302 to register with MFP Web application 220. If the MFP user has previously provided an email address, the MFP user may select the user list button 304 or scan/swipe an RFID or other smartcard (herein referred to as "MFP cards") on a card reader of MFP 110. MFP Web application 220 may then use the card identifier and/or other identification data to look up the corresponding MFP user's email address. Thus, the MFP user does not have to enter an email address each time the MFP user would like to register with an MFP Web application.

Figure 4:
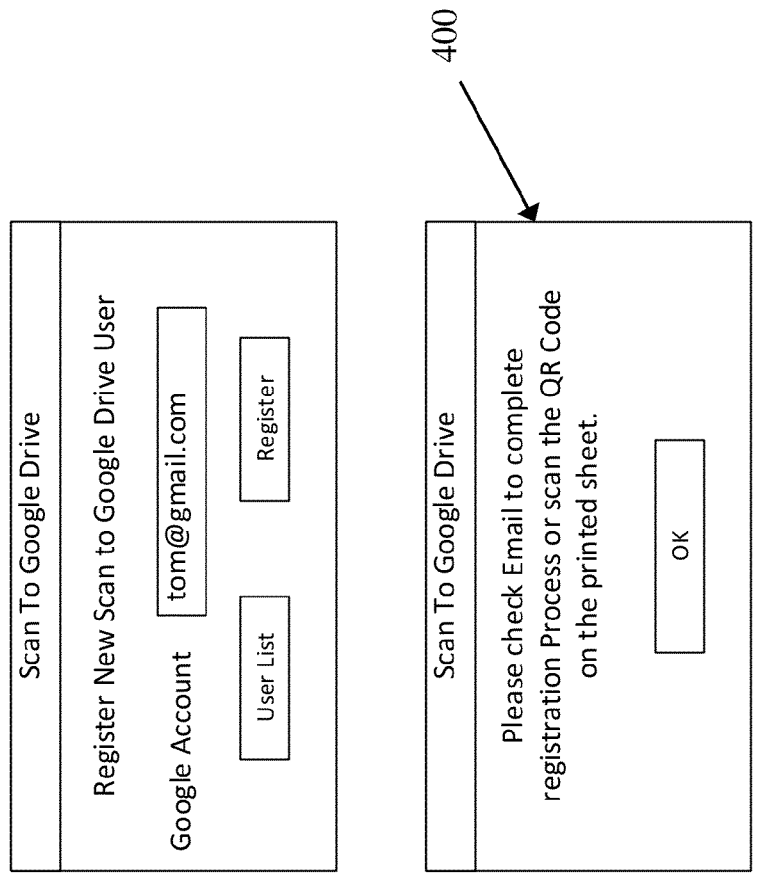
FIG. 4 is a block diagram that depicts an example MFP interface for registering a user with an MFP Web application, according to an embodiment.

FIG. 4 is a block diagram that depicts an example MFP interface for registering a user with an MFP Web application, according to an embodiment. Once the user has entered an email address in entry field 302 and pressed register button 306, MFP 110 sends a registration request to MFP Web application 220 that includes the email address. In response to receiving the request, MFP Web application 220 may generate and send an email message and/or encoded data as described in more detail below. MFP Web application 220 may also send a message, such as depicted in interface 400, instructing the MFP user to check the email at the email address provided by the MFP user and/or scan a Quick Response (QR) code on a sheet printed by MFP 110.

C. Registration via Email

In some embodiments, when MFP Web application 220 receives a registration request from MFP 110, MFP Web application 220 generates and sends an email to an email address associated with the registration request. The email address may be included in the registration request sent by MFP 110. Alternatively, the email address may be identified based on other MFP user identification data included in the registration request. For example, the registration request may include an MFP user ID or card ID. MFP Web application 220 may search a database using the MFP user identification data to determine an email address for the registering MFP user where the generated email should be sent.

In some embodiments, MFP 110 may prompt the user for an email address that is associated with an external Web service that the MFP user would like to access. For example, the MFP user may have previously created an account with the external Web service using a particular email address. MFP 110 may request that the MFP user provide the same email address when registering with the MFP Web application that connects to the external Web service. An associated email address may be an added security measure to authenticate the MFP user at the external Web service. In other embodiments, the MFP user may provide an email address that is not associated with the external Web service. The MFP user may thus provide the MFP 110 with any email address to which the MFP user has access.

Figure 5:
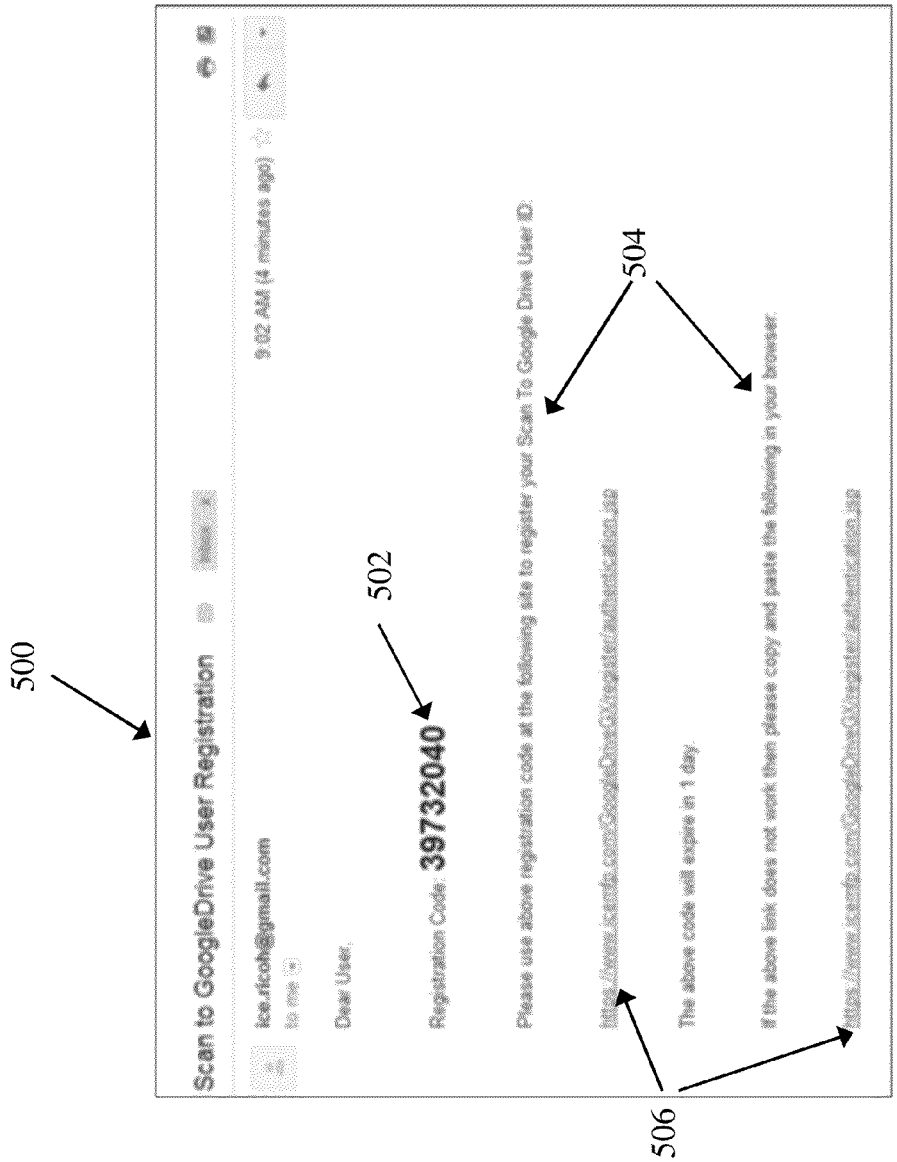
FIG. 5 is a screenshot of an example email that includes a unique registration code and a link to a MFP Web application for completing the registration process, according to an embodiment.

After the email has been sent, the MFP user may use a host computer, such as one of host devices 210, to access the email and proceed with the registration process. FIG. 5 is a screenshot of an example email that includes a unique registration code and a link to a MFP Web application for completing the registration process. Email 500 includes registration code 502, instructions 504, and link 506. Registration code 502 may be any alphanumeric string comprising one or more alphabetic characters and/or one or more numeric characters that uniquely identifies an MFP user that issued the request. Details of using the registration code to complete the registration process are described in more detail below. Instructions 504 specify how the user should proceed with the registration process. For example, instructions 504 may direct the user to follow link 506, either by selecting the link or pasting the link into a browser application running on the host device. Link 506 is a Uniform Resource Locator (URL) that starts an authorization process, such as a process conforming to an OAuth protocol, to authorize MFP Web application 220 to access external Web service 230.

D. Registration via Encoded Link

In some embodiments, when MFP Web application 220 receives a registration request from MFP 110, MFP Web application 220 generates and sends encoded data that encodes a link for starting an authorization process, such as a process conforming to an OAuth protocol, to authorize MFP Web application 220 to access external Web service 230. Example encoded data that may be generated and sent may include, without limitation, Quick Response (QR) codes, Microsoft Tags, EZ tags and other matrix codes.

In some embodiments, MFP Web application 220 causes MFP 110 to print the encoded data. For example, MFP Web application 220 may send print data or some other print request to MFP 110 for printing the encoded data on a printed sheet. In response to receiving the print data, MFP 110 may proceed to print the encoded data for the MFP user using a print subsystem. In addition or alternatively, MFP 110 may display the encoded data on a display panel coupled to MFP 110. The MFP user may scan the encoded data from the printed sheet or display panel to follow the encoded link and proceed with the registration process. In an example embodiment, the MFP user may scan the encoded data using a camera coupled to one of host devices 210. The host device may use an application, such as a QR code or other matrix code reader, to decode and follow the link.

Figure 6:
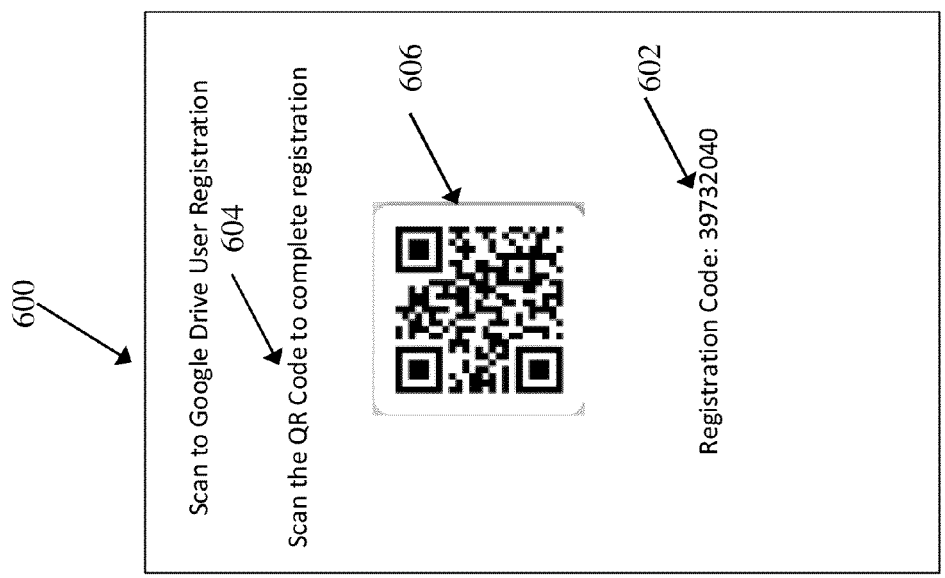
FIG. 6 is a block diagram depicting an example printed sheet that includes a registration code and a Quick Response (QR) code encoding a link to a MFP Web application for completing the registration process, according to an embodiment.

FIG. 6 is a block diagram depicting an example printed sheet that includes a registration code and a QR code encoding a link to a MFP Web application for completing the registration process. Printed sheet 600 includes registration code 602, instructions 604, and QR code 606. Registration code 602 may be any alphanumeric string comprising one or more alphabetic characters and/or one or more numeric characters that uniquely identifies an MFP user that issued the request. If an email has been sent, registration code 602 may be the same or different registration code included in the email, depending on the particular implementation. Instructions 604 specify how the user should proceed with the registration process. For example, instructions 604 may direct the user to scan QR code 606 to proceed with registration. QR code 606 encodes a link such a URL to MFP Web application 220. When the MFP user scans and decodes the QR code to follow the link, MFP Web application 220 starts an authorization process, such as a process conforming to an OAuth protocol, to authorize MFP Web application 220 to access external Web service 230.

E. Browser Redirection and Access Authorization

By following the link included in the email or encoded data as described above, an authorization process for authorizing MFP Web application 220 to access external Web service 230 begins. In some embodiments, the link may be a redirect URL that redirects a browser or other client application from a site/website associated with MFP Web application 220 to a site/website associated with external Web service 230. For example, when the user selects the link, a browser application executing on one of host devices 210 may send a request to access a resource of MFP Web application 220 identified by the redirect URL. In response MFP Web application 220 may redirect the browser application to an authorization endpoint, such as an account login for the corresponding external Web service(s).

Figure 7:
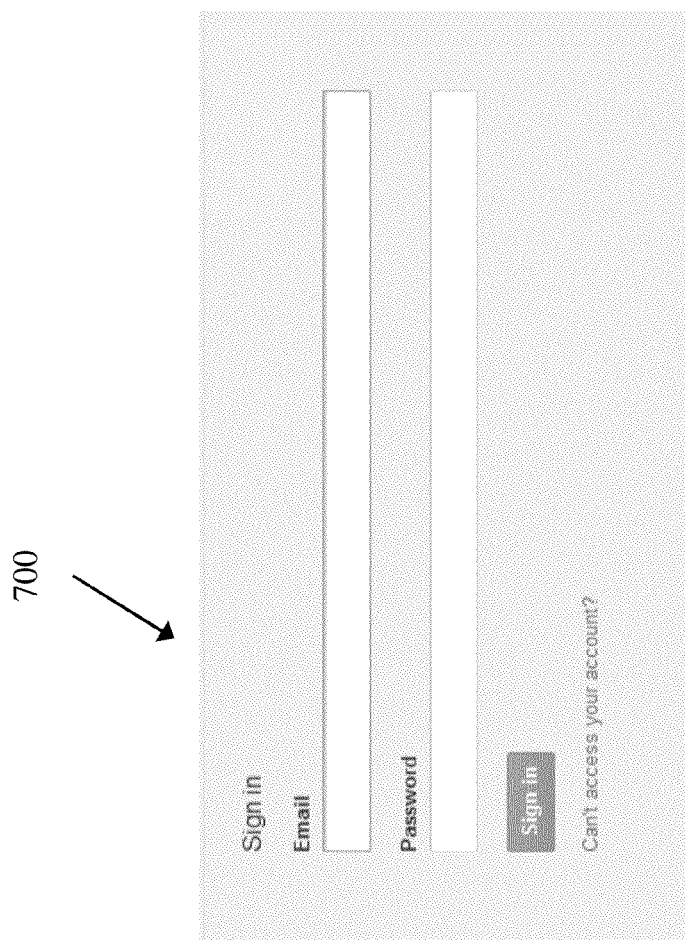
FIG. 7 is a screenshot of an example external Web service login webpage for authenticating a user, according to an embodiment.

FIG. 7 is a screenshot of an example external Web service login webpage for authenticating a user. The user may submit authentication credentials to the external Web service through an interface such as interface 700. The authentication credentials may include, without limitation, a user ID and a password. The user ID may be an email address or some other identifier that uniquely identifies the user's account/service provided by external Web service 230. The authentication credentials submitted through interface 700 are provided through interface 700 to external Web service 230; however, the authentication credentials are not provided to MFP Web application 220. Thus, the MFP user may authorize MFP Web application to access an external Web service without revealing the authentication credentials to MFP Web application 220.

Figure 8:
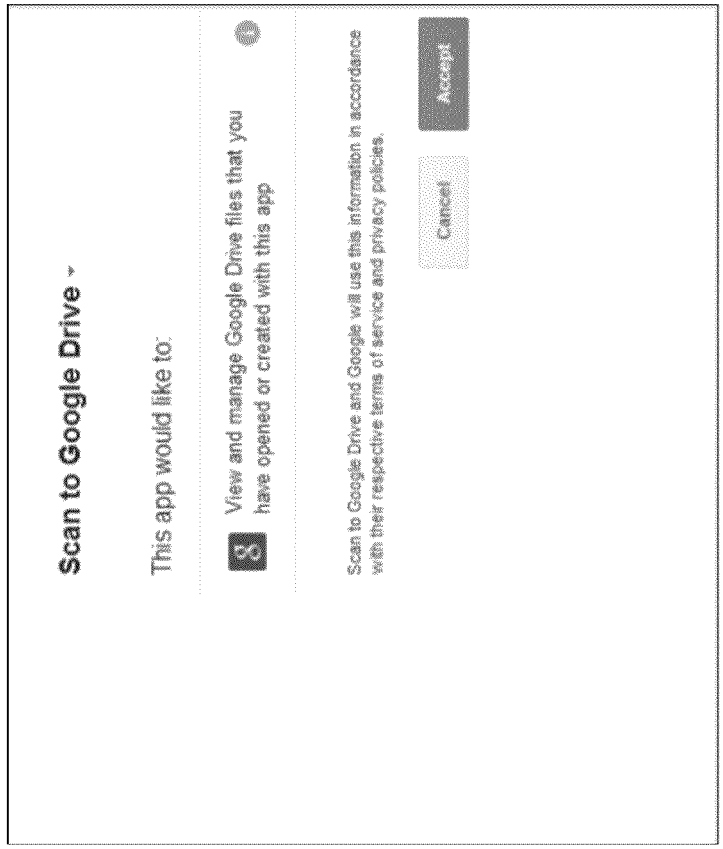
FIG. 8 is a screenshot depicting an example authorization request for authorizing an MFP Web application to access an external Web service, according to an embodiment.

FIG. 8 is a screenshot depicting an example authorization request for authorizing an MFP Web application to access an external Web service. Interface 800 identifies the resources that MFP Web application 220 is requesting to access. In response to selecting accept, external Web service 230 provides MFP Web application 220 with access to the user's account. For example, in response to the user selecting accept, the external Web service may return an authentication code to MFP Web application 220. MFP Web application 220 may use the authentication code to obtain an access token from external Web service 230 in accordance with the authorization code flow of the OAuth 2.0 protocol. In an alternative embodiment, MFP Web application 220 may obtain an access token from external Web service 230 without an authorization code in accordance with the implicit grant flow of the OAuth 2.0 protocols. In other embodiments, MFP Web application 220 may use other authorization protocols to obtain an access token. Examples include, without limitation, OpenID, and SAML.

The access token provides MFP Web application 220 with access to protected resources within external Web service 230. In an example embodiment, the access token may provide MFP Web application 220 with permission to read, write, and/or modify data associated with the user's account. The access token may also define the scope of permission for accessing the protected resources. For instance, the access token may allow MFP Web application 220 read, but not write or modify data in the user's account. As another example, the access token may allow MFP Web application 220 to write, but not read or modify data in the user's account. As yet another example, the access token may grant access to a specific type of resource, such as contacts, emails, and/or photos, but deny access to other types of resources.

F. Registration Code Processing and Access Token Mapping

After the MFP user has authorized external Web service 230 to grant access privileges to MFP Web application 220, control is directed back to MFP Web application 220. The user is then prompted to enter the registration code sent via email and/or with the encoded data.

Figure 9:
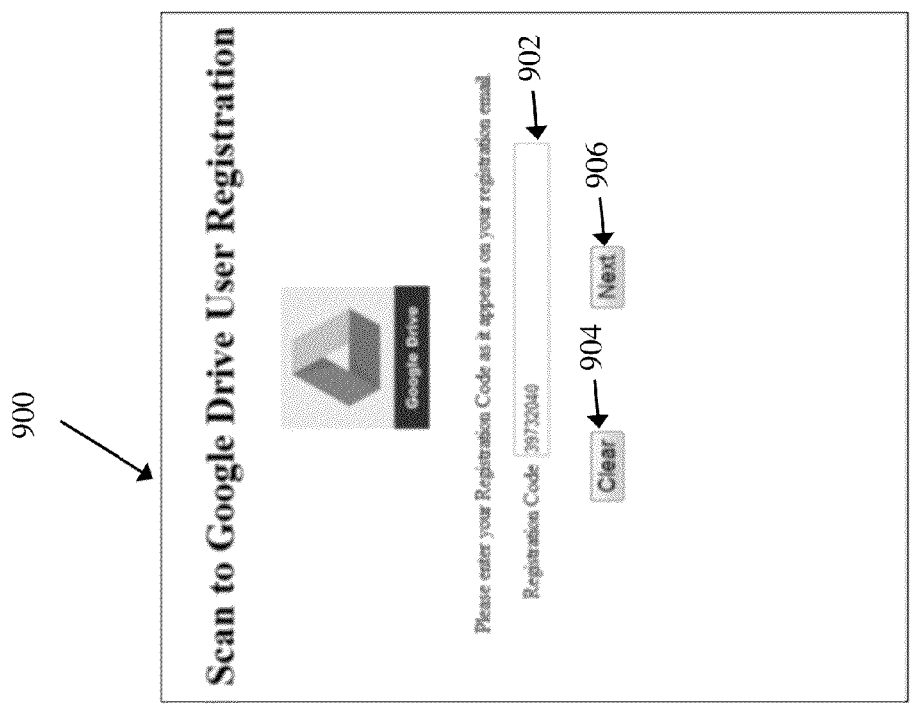
FIG. 9 is a screenshot depicting an example interface for submitting a registration code for registering an external Web service with an MFP Web application, according to an embodiment.

FIG. 9 is a screenshot depicting an example interface for submitting a registration code for registering an external Web service with an MFP Web application. Interface 900 includes registration code entry field 902, clear button 904, and next button 906. Interface 900 may be displayed by the browser or other client application on one of host devices 210 (e.g., the same host device used to follow the link in the email or encoded data). Once the user has entered the registration code in registration code entry field 902, the user may select next button 906 to proceed with the registration process. If the user has made a mistake while entering the registration code, the user may select clear button 904 to completely delete all characters from registration code entry field 902.

MFP Web application 220 uses the registration code to retrieve MFP user identification data for the MFP user that is registering with MFP Web application 220. MFP user identification data may generally comprise any data that uniquely identifies a particular MFP user for a set of one or more MFP users that use MFP 110. Example MFP user identification data may include, without limitation, a user ID, a card ID, a user's email address, and an organization ID.

Figure 10:
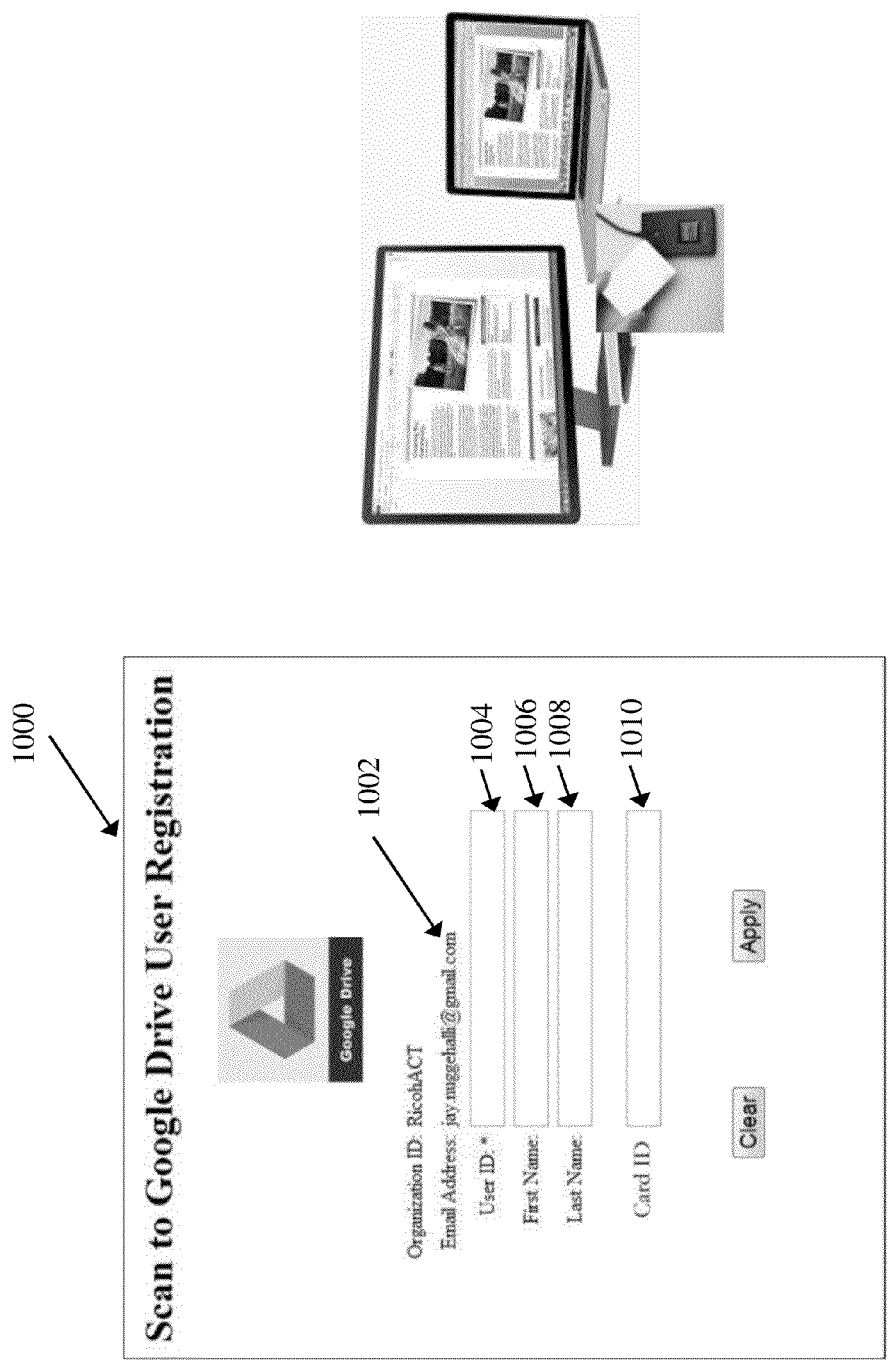
FIG. 10 is a screenshot and picture depicting an example interface for displaying and submitting MFP user identification data for registering with an MFP Web application, according to an embodiment.

After the MFP user has submitted the registration code, MFP Web application 220 may retrieve and/or prompt the MFP user for MFP user identification data to map to the access token. FIG. 10 is a screenshot and picture depicting an example interface 1000 for displaying and submitting MFP user identification data for registering with an MFP Web application. Referring to FIG. 10, email address 1002 is automatically retrieved and displayed based on the registration code provided through registration code entry field 902. Interface 1000 also includes entry fields for user ID (entry field 1004), a first name (entry field 1006), a last name (entry field 1008), and/or a card ID (entry field 1010). In an embodiment, MFP Web application 220 may automatically retrieve and display information in one or more of these fields using the registration code if the MFP user has previously provided this information. In an alternative embodiment, MFP Web application 220 may only retrieve this information if the MFP user scans or swipes their MFP card at a card reader coupled to the host machine used to follow the link in the email or the encoded data. If the MFP user does not use their MFP card and/or if the MFP Web application 220 does not have access to the MFP user identification data, then the MFP user may manually enter this information into entry fields 1004 to 1010.

Figure 11:
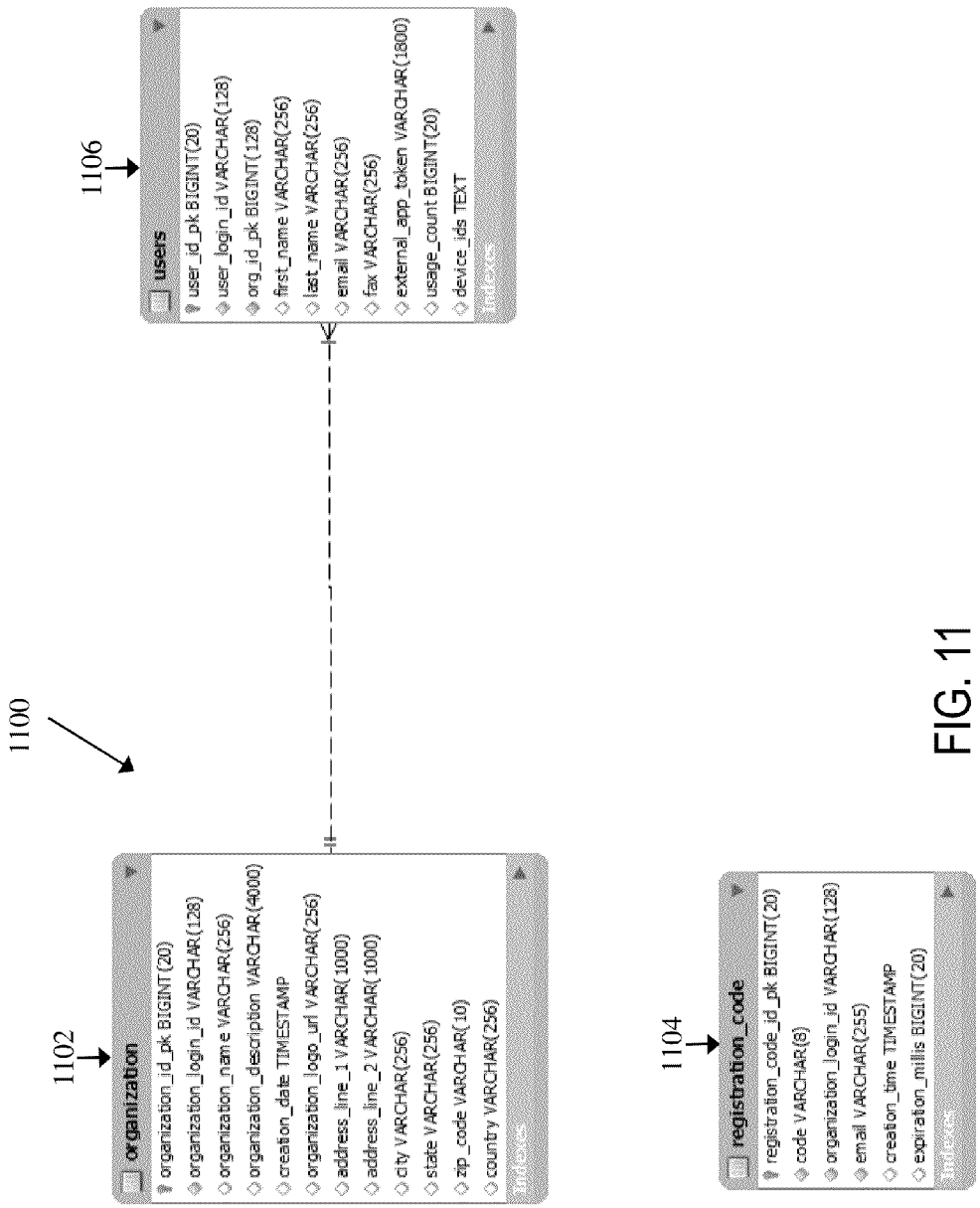
FIG. 11 is a sample database schema depicting example MFP user identification data and mapping data maintained by a MFP Web application for registering an MFP user, according to an embodiment.

Once MFP Web application 220 has the MFP user identification data, MFP Web application 220 generates and stores mapping data that maps the MFP user identification data to the access token. FIG. 11 is a sample database schema depicting example MFP user identification data and mapping data maintained by a MFP Web application for registering an MFP user, according to an embodiment. Database schema 1100 generally comprises organization data 1102, registration code data 1104, and user data 1106. Organization data 1102 stores data that identifies an organization associated with a set of one or more MFP users and/or an MFP device. For example, organization data 1102 may include, without limitation, a name and address of an organization that owns MFP 110. Registration code data 1104 stores data which uniquely identifies a particular registration request from a particular MFP user. Registration code data 1104 may include, without limitation, the registration code assigned to a registration request, a link to user data 1106 for the MFP user that submitted the registration request, a creation time for the registration code, and an expiration time for the registration code. User data 1106 stores data that uniquely identifies an MFP user from a set of one or more MFP users. User data 1106 may include, without limitation, a user identifier, a given name, a legal name, an email address, contact information, a link to organization data 1102 for an organization to which the MFP user belongs, and a set of one or more access tokens received from a corresponding set of one or more external Web services. Thus, user data 1106 maps MFP user identification data for a particular user to a set of one or more access tokens. When an MFP user has registered for multiple MFP Web applications according to the registration process described herein, user data 1106 may map the MFP user identification data to an access token for each of the MFP Web applications for which the MFP user has registered.

Figure 12:
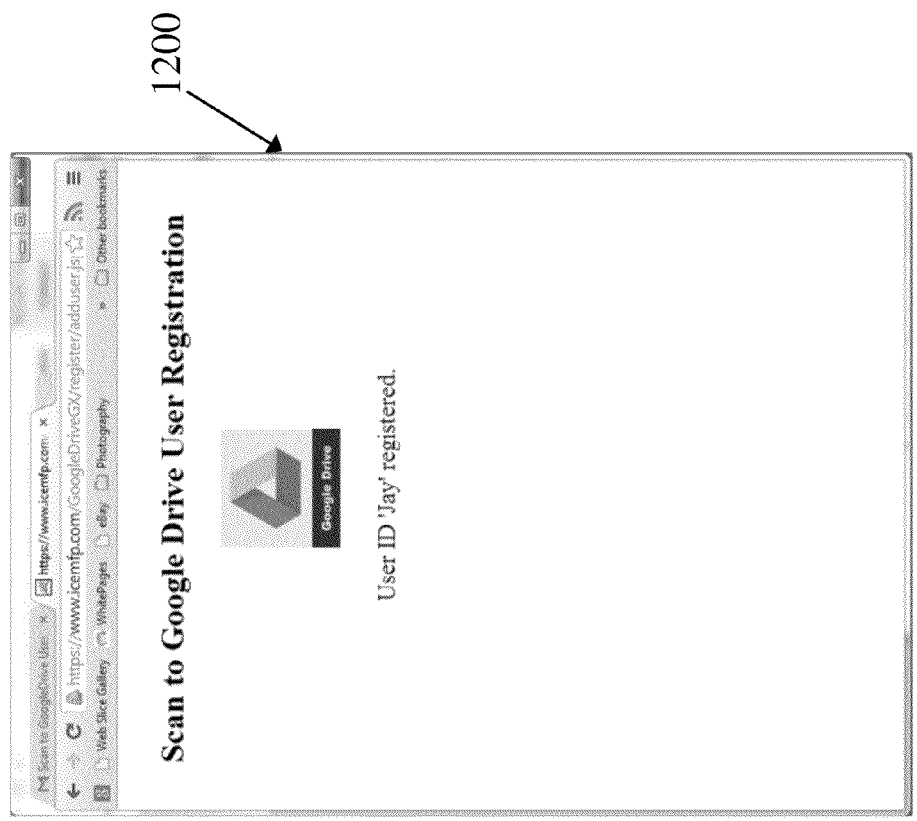
FIG. 12 is a screenshot depicting an example notification indicating that the registration process has completed, according to an embodiment.

FIG. 12 is a screenshot depicting an example notification indicating that the registration process has completed. Screen 1200 may be displayed on the browser or other client application on one of host devices 210 after MFP Web application 220 has generated the mapping data that maps the MFP user identification data to the access token returned by external Web service 230.

If the registration code has not been processed before a predefined period of time, the registration code may expire according to some embodiments. For example, if MFP Web application 220 receives a registration code and determines from registration code data 1104 that the code has expired, then MFP Web application 220 may notify the MFP user that the registration code is no longer valid. MFP user may then begin the registration process from the beginning to register with MFP Web application 220.

G. Example Message Ladder Diagram

Figure 13:
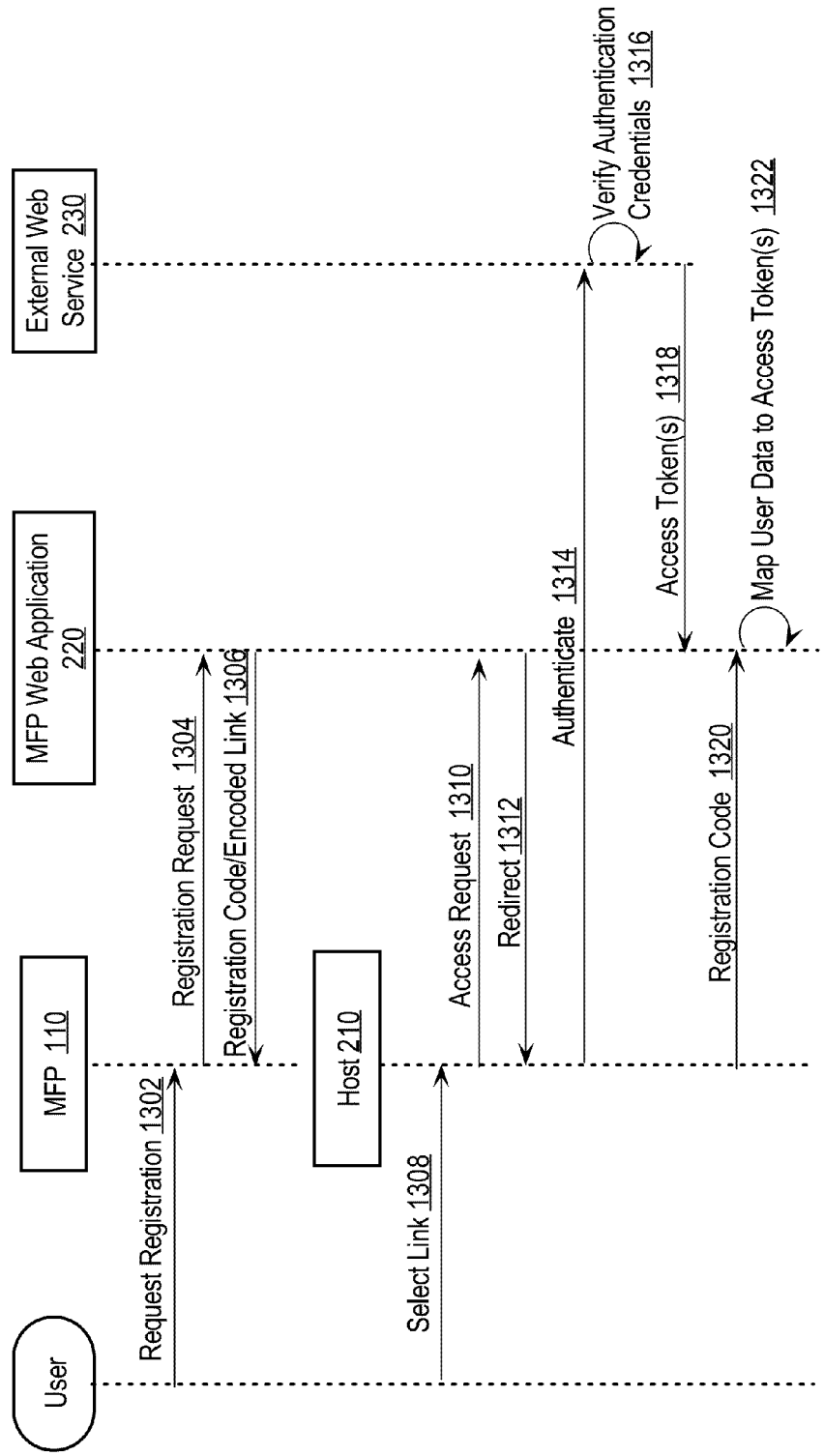
FIG. 13 is a message ladder diagram depicting example messages exchanged between an MFP, MFP Web Services, and external Web services, according to an embodiment, according to an embodiment.

FIG. 13 is a message ladder diagram depicting example messages exchanged between an MFP, MFP Web Services, and external Web services, according to an embodiment. In step 1302, MFP 110 receives a request from an MFP user to register with an MFP Web application. In step 1304, MFP 110 sends a registration request to MFP Web application 220. The registration request may include an email address and/or other registration information that identifies the MFP user submitting the request.

In step 1306, MFP Web application 220 sends MFP 110 a registration code and encoded data encoding a link to MFP Web application 220 that starts an authorization process for authorizing MFP Web application 220 to access external Web service 230. In addition or as an alternative to step 1306, MFP Web application 220 may generate and send an email that includes the link and registration code to an email address identified by the registration request.

In step 1308, the MFP user follows the link sent in an email or in the encoded data at step 1306. For example, the MFP user may click on the link or paste the link into a browser application running on host device 210. In step 1310, host device 210 sends and MFP Web application 220 receives an access request comprising an access redirect URL.

In step 1312, MFP Web application 220 redirects host device 210 to an authorization endpoint associated with external Web service 230. During this step, MFP Web application 220 may send host device 210 an application identifier that uniquely identifies MFP Web application 220 to external Web service 230, a requested scope of access, and a redirection URL to which external Web service 230 will return host device 210 once access is granted (or denied).

In step 1314, external Web service 230 receives the client identifier, redirection URL, and authentication credentials from host device 210. The client identifier and redirection URL are those provided to host device 210 at step 1312. The authentication credentials, however, are sent by host device 210 without being revealed to MFP Web application 220.

In step 1316, external Web service 230 verifies the authentication credentials are correct to authenticate the registering MFP user. For example, external Web service 230 may determine if a valid user ID and password pair has been received.

Upon successful authentication of the user, in step 1318, external Web service 230 returns an access token to MFP Web application 220. The manner in which the access token is returned may vary from implementation to implementation. For example, external Web service 230 may first return an authorization code to one of host devices 210 at this step in accordance with the authorization code flow of OAuth 2.0. Host device 210 then returns the authorization code to MFP Web application 220, which sends the authorization code to external Web services 230 to obtain the access token. In an alternative embodiment, external Web service 230 may return the access token to MFP Web application 220 via one of host device 210 without returning an authorization code in accordance with the implicit grant flow of OAuth 2.0. During this step, external Web service 230 also redirects host device 210 back to MFP Web application 220 using the redirect URL provided at step 1312.

In step 1320, MFP Web application 220 receives the registration code from host device 210. In response to receiving the registration code, MFP Web application 220 retrieves MFP user information for the registering MFP user or requests the MFP user to provide the information through host device 210.

In step 1322, MFP Web application 220 generates and stores mapping data that maps the MFP user identification data to the access token received in step 1316. For example, MFP Web application 220 may store the access token in a registration database as depicted in FIG. 11.

IV. Secure Access of External Web/Cloud Services Using an MFP Web Application

Once the MFP user has completed the registration process, the MFP user may begin to use MFP Web application 220 to access external Web service 230 via MFP 110. The manner in which MFP Web application 220 is used by the MFP user and in which MFP Web application 220 accesses external Web service 230 may vary from implementation to implementation.

In an example embodiment, MFP Web application 220 may be a scan to cloud application, and the access token granted by external Web service 230 may grant MFP Web application 220 access to write data to cloud storage. Once registered, an MFP user may generate scanned image data using MFP 110. MFP 110 then sends the scanned image data to MFP Web application 220, which may use document processing logic 122 to OCR the scanned image data into a searchable document format. MFP Web application 220 may subsequently use the access token to store the document data in external Web service 230. Once stored in the cloud, the MFP user may access the document data by logging into external Web service 230 using other network devices, such as one of host devices 210.

In another example embodiment, MFP Web application 220 may be a print from cloud application, and the access token granted by external Web service 230 may grant MFP Web application 220 access to read data from external Web service 230. Once registered, an MFP user may navigate to MFP Web application 220 to browse documents, emails, or other data stored in external Web service 230. The MFP user may then select a particular file for printing by MFP 110. In response, MFP Web application 220 reads the file from external Web service 230 using the access token, generates print data for the file using document processing logic 122, and sends the print data to MFP for printing.

A. Example MFP Interface for Using MFP Web Applications

MFP 110 may provide a UI to a set of one or more MFP users to access one or more MFP Web applications for which the respective user(s) are registered. The UI that is presented to an MFP user may vary from implementation to implementation and may be different depending on the MFP Web application that the MFP user is accessing.

Figure 14:
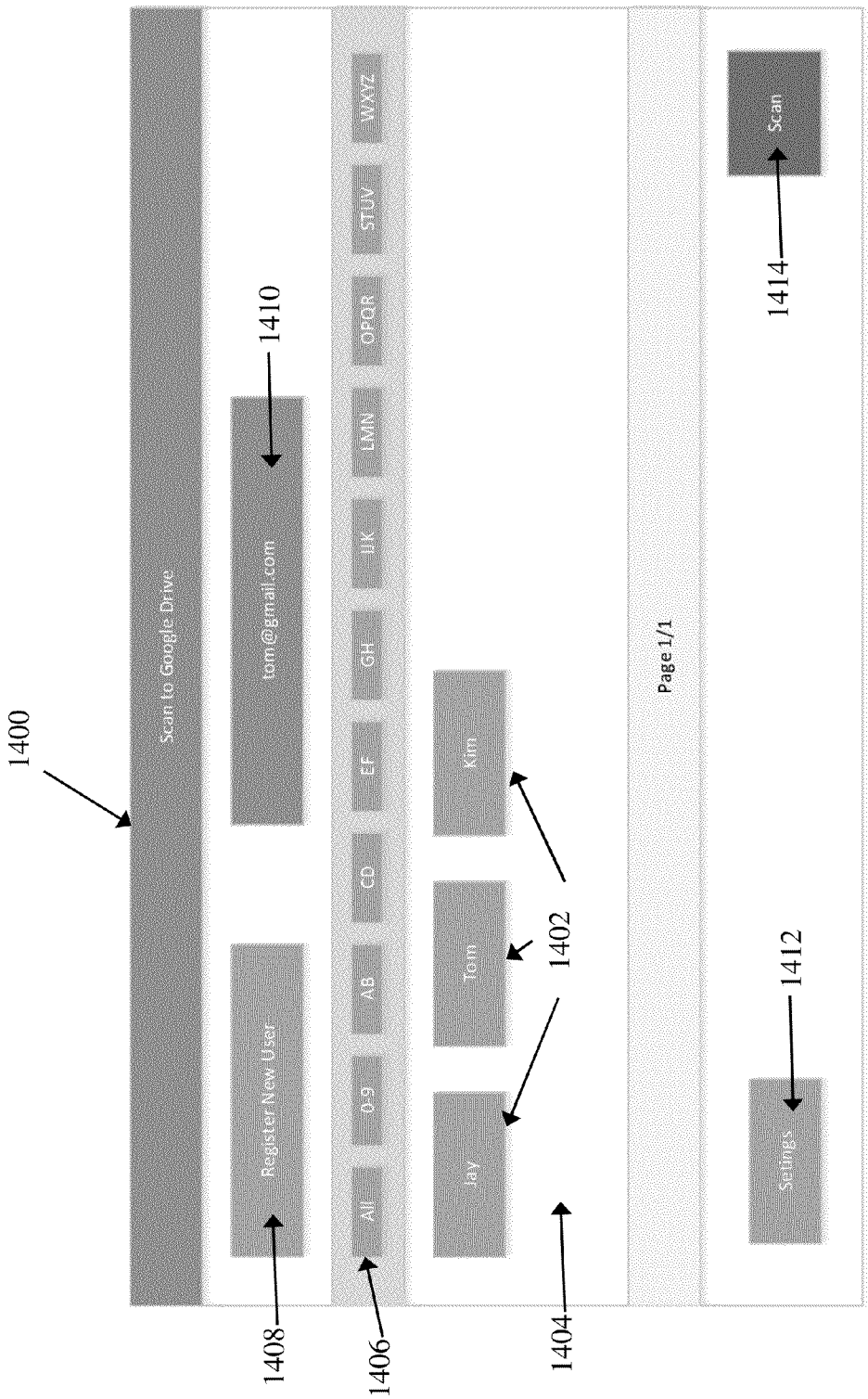
FIG. 14 is a screenshot depicting an example user interface on an MFP for using an MFP Web application, according to an embodiment.

FIG. 14 is a screenshot depicting an example user interface on an MFP for using an MFP Web application, according to an embodiment. Interface 1400 may be shown on a display panel of MFP 110 in response to an MFP user scanning or otherwise swiping an MFP card, if the MFP user is already registered to use MFP Web application 220. In an alternative embodiment, interface 1400 may be shown without using the MFP card by selecting one of UserID buttons 1402 corresponding to the MFP user. UserID buttons 1402 are displayed in display area 1404 and may correspond to MFP users that are registered with MFP Web application 220. Sorting buttons 1406 may be used to sort through a list of MFP users that are registered to use MFP Web application 220. For example, these buttons may be used to limit, alphabetically, which UserID buttons 1402 are displayed in display area 1404. This may be useful if there are a relatively large number of MFP users registered with MFP Web application 220. If an MFP user is not registered with MFP Web application 220, the MFP user may select register new user button 1408 to begin the registration process as described above. Email address display area 1410 displays the email address of the MFP user that is currently using MFP Web application 220. Settings button 1412 may be used to change the setting, either globally or per MFP user, associated with MFP Web application 220. Scan button 1414 may be used to scan document data to the current MFP user's cloud service via MFP Web application 220. In other embodiments, different buttons, display areas, and/or other UI elements may be presented to the MFP user based on the particular MFP Web application that the MFP user is accessing. For example, an MFP Web application that allows an MFP user to browse and print emails may include a display area for browsing emails and a print button for printing a selected email. Thus, the example interfaces depicted herein are given solely by way of illustration and not by way of limitation.

B. Integration of RFID and Other Smartcards

RFID and other smartcards ("MFP cards") may be integrated into system 100 to augment ease of use. For example, each MFP user from a set of MFP users may be issued a different MFP card. Each different MFP card may be associated with a different card identifier. When an MFP user would like to use an MFP Web application, the MFP user swipes or scans their MFP card at a card reader coupled to MFP 110.

Figure 15:
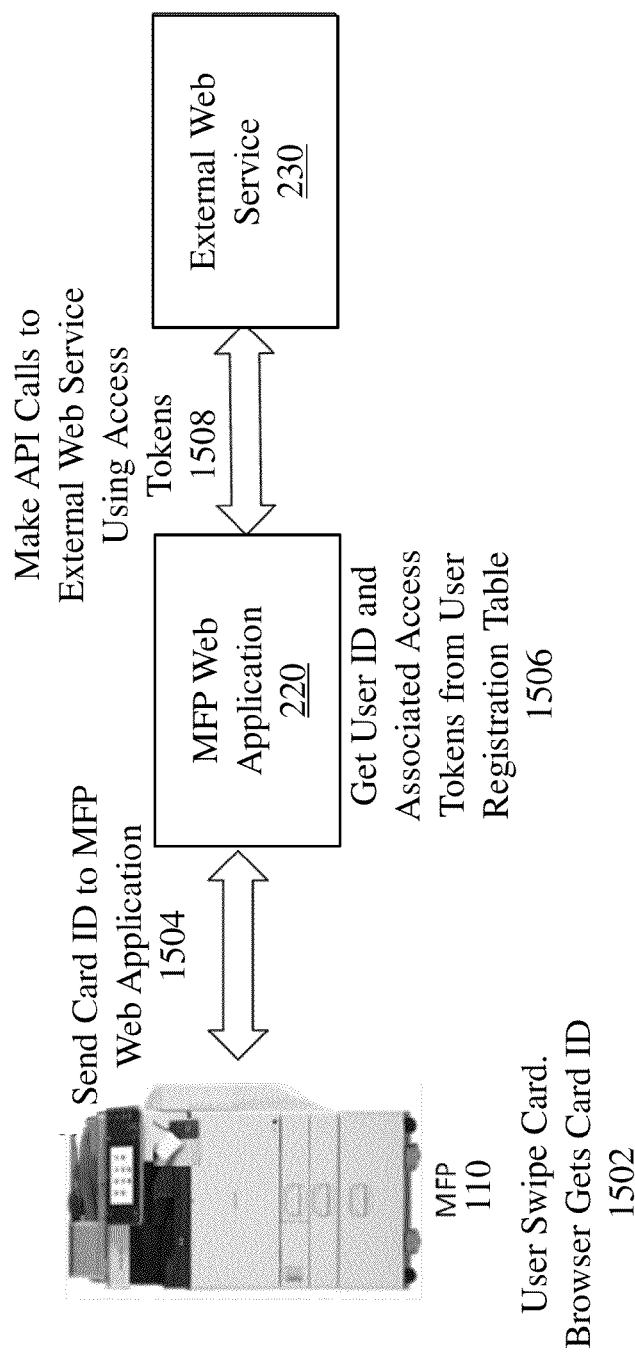
FIG. 15 is a block diagram depicting an example workflow overview for accessing an external Web service after the registration process has completed, according to an embodiment.

FIG. 15 is a block diagram depicting an example workflow overview for accessing an external Web service after the registration process has completed, according to an embodiment. In step 1502, an MFP user swipes or scans their card at a card reader coupled to MFP 110. In response, a browser application running on MFP 110 fetches the card ID from the card reader.

In step 1504, MFP 110 sends the card ID to MFP Web application 220. In step 1506, MFP Web application 220 uses the received card ID to look up and fetch, from a registration table, a corresponding user ID and its associated access tokens. In step 1508, MFP Web application 220 performs one or more API calls to external Web service 230 using one or more access tokens retrieved at step 1506.

An MFP user may use a single MFP card to access different MFP Web applications and external Web services, according to some embodiments. For example, a single MFP card for an MFP user may map to access tokens for each MFP Web application for which the MFP user has registered. Accordingly, the MFP user may swipe the MFP card at MFP 110. In response, MFP 110 retrieves the card ID and sends the card ID to a first MFP Web application (e.g., MFP Web application 220). The first MFP Web application retrieves an access token used by the first MFP Web application to access a corresponding first external Web service for the MFP user. The MFP user may then navigate to a second MFP Web application to access a different external Web service. The MFP user may rescan their MFP card or MFP 110 may allow the MFP user to switch between MFP Web applications without rescanning the MFP card, depending on the particular implementation. The same card ID is then sent to the second MFP Web application, which may use the card ID to lookup the MFP user identification information and retrieve a second access token for accessing a second external Web service. The first and second access tokens are different in that the first token is issued by the first external Web service and the second access token is issued by the second external Web service. The first access token permits access to the first external Web service but not the second external Web service, whereas the second access token permits access to the second external Web service cannot be used to access the first external Web service. This process may be repeated for other MFP Web applications for which the MFP user is registered.

Card integration allows the MFP Web application to authenticate and/or distinguish between MFP users without requiring MFP users to manually enter authentication credentials. For example, if MFP Web application 220 receives a first card ID at step 1506, MFP Web application 220 may use the first card ID to identify first MFP user identification data and retrieve a first access token. The MFP Web application 220 may subsequently receive a second card ID associated with the MFP card of a second MFP user. The MFP Web application 220 then uses the second card ID to identify second MFP user identification data that identifies the second user and to retrieve a second access token. The first access token allows MFP Web application 220 to access the first user's account with external Web service 230, and the second access token allows MFP Web application 220 to access the second user's account with external Web service 230. To prevent the second user from accessing the first user's cloud service and vice versa, MFP Web application 220 may restrict access to the first access token to MFP users that swipe a card having the first card ID and access to the second access token to MFP users that swipe a card having the second card ID. If the MFP user does not have an MFP card available, MFP Web services 120 may optionally require the MFP user to authenticate before allowing access to the MFP Web applications and their corresponding access tokens. Thus, the MFP users are restricted to accessing/using access tokens for their corresponding accounts in external Web services 130. In addition, there may be a one-to-many relationship between the cardID and/or MFP authentication credentials and the access tokens and external Web services. For example, a single MFP card and/or set of MFP authentication credentials may map to many access tokens and, thus, be used to access many different external Web services. Once the MFP user has registered with MFP Web application 220, the MFP user may access external Web service 230 without resubmitting the authentication credentials to the external Web service 230 each time the MFP user would like to access their account via MFP 110 and without revealing the authentication credentials for external Web service 230 to MFP 110 or MFP Web services 120. This process may be repeated for a plurality of MFP Web applications and external Web services, and a single MFP card may be used to access each of these services.

V. Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 16:
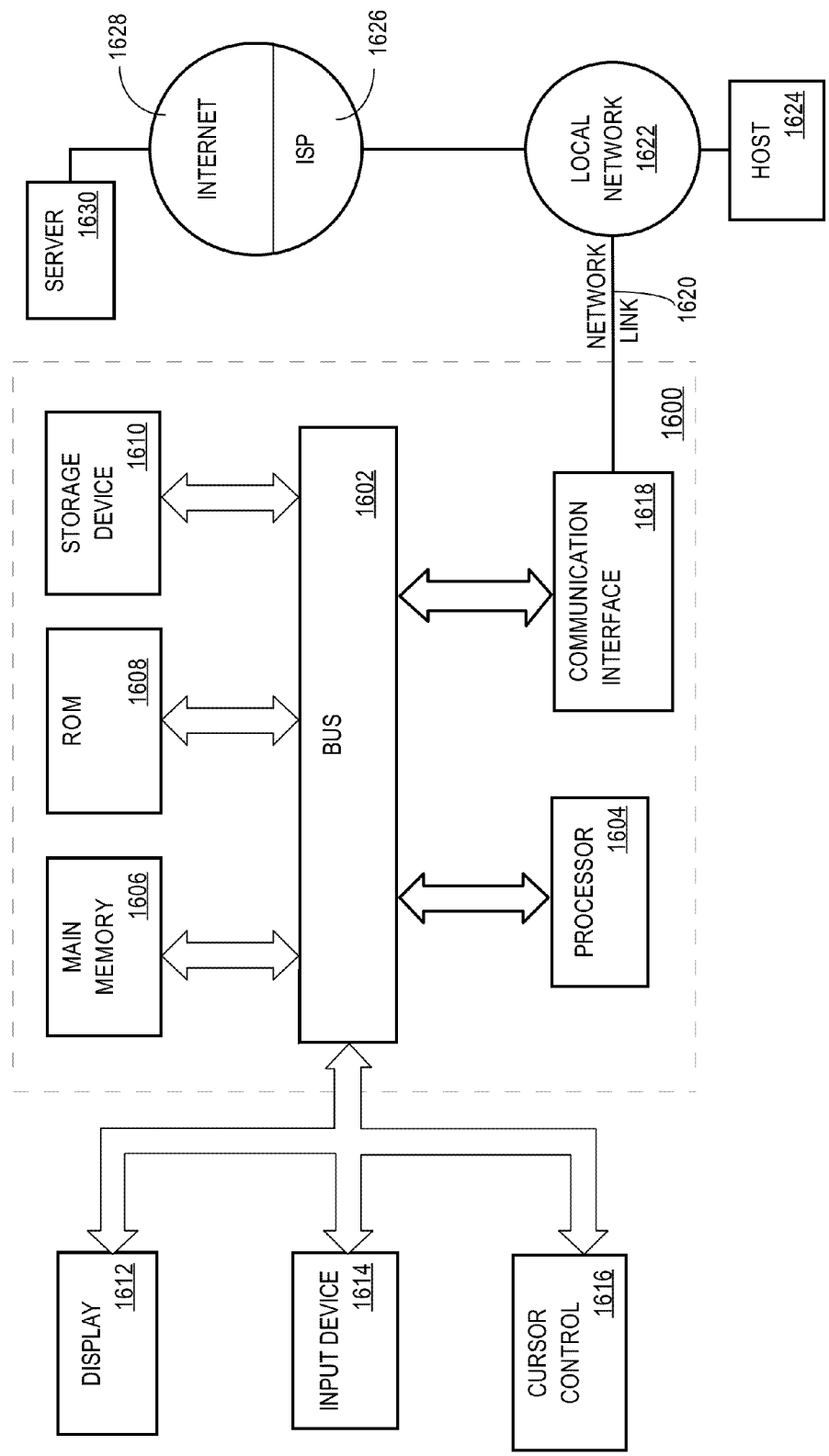
FIG. 16 is a block diagram of a computer system on which embodiments described herein may be implemented.

For example, FIG. 16 is a block diagram that illustrates a computer system 1600 upon which an embodiment of the invention may be implemented. Computer system 1600 includes a bus 1602 or other communication mechanism for communicating information, and a hardware processor 1604 coupled with bus 1602 for processing information. Hardware processor 1604 may be, for example, a general purpose microprocessor.

Computer system 1600 also includes a main memory 1606, such as a random access memory (RAM) or other dynamic storage device, coupled to bus 1602 for storing information and instructions to be executed by processor 1604. Main memory 1606 also may be used for storing temporary variables or other intermediate information during execution of instructions to be executed by processor 1604. Such instructions, when stored in non-transitory storage media accessible to processor 1604, render computer system 1600 into a special-purpose machine that is customized to perform the operations specified in the instructions.

Computer system 1600 further includes a read only memory (ROM) 1608 or other static storage device coupled to bus 1602 for storing static information and instructions for processor 1604. A storage device 1610, such as a magnetic disk, optical disk, or solid-state drive is provided and coupled to bus 1602 for storing information and instructions.

Computer system 1600 may be coupled via bus 1602 to a display 1612, such as a cathode ray tube (CRT), for displaying information to a computer user. An input device 1614, including alphanumeric and other keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane.

Computer system 1600 may implement the techniques described herein using customized hard-wired logic, one or more ASICs or FPGAs, firmware and/or program logic which in combination with the computer system causes or programs computer system 1600 to be a special-purpose machine. According to one embodiment, the techniques herein are performed by computer system 1600 in response to processor 1604 executing one or more sequences of one or more instructions contained in main memory 1606. Such instructions may be read into main memory 1606 from another storage medium, such as storage device 1610. Execution of the sequences of instructions contained in main memory 1606 causes processor 1604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1610. Volatile media includes dynamic memory, such as main memory 1606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1602. Transmission media can also take the form of acoustic or light waves, such as those generated during radio-wave and infra-red data communications.

Various forms of media may be involved in carrying one or more sequences of one or more instructions to processor 1604 for execution. For example, the instructions may initially be carried on a magnetic disk or solid-state drive of a remote computer. The remote computer can load the instructions into its dynamic memory and send the instructions over a telephone line using a modem. A modem local to computer system 1600 can receive the data on the telephone line and use an infra-red transmitter to convert the data to an infra-red signal. An infra-red detector can receive the data carried in the infra-red signal and appropriate circuitry can place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

Computer system 1600 also includes a communication interface 1618 coupled to bus 1602. Communication interface 1618 provides a two-way data communication coupling to a network link 1620 that is connected to a local network 1622. For example, communication interface 1618 may be an integrated services digital network (ISDN) card, cable modem, satellite modem, or a modem to provide a data communication connection to a corresponding type of telephone line. As another example, communication interface 1618 may be a local area network (LAN) card to provide a data communication connection to a compatible LAN. Wireless links may also be implemented. In any such implementation, communication interface 1618 sends and receives electrical, electromagnetic or optical signals that carry digital data streams representing various types of information.

Network link 1620 typically provides data communication through one or more networks to other data devices. For example, network link 1620 may provide a connection through local network 1622 to a host computer 1624 or to data equipment operated by an Internet Service Provider (ISP) 1626. ISP 1626 in turn provides data communication services through the world wide packet data communication network now commonly referred to as the "Internet" 1628. Local network 1622 and Internet 1628 both use electrical, electromagnetic or optical signals that carry digital data streams. The signals through the various networks and the signals on network link 1620 and through communication interface 1618, which carry the digital data to and from computer system 1600, are example forms of transmission media.

Computer system 1600 can send messages and receive data, including program code, through the network(s), network link 1620 and communication interface 1618. In the Internet example, a server 1630 might transmit a requested code for an application program through Internet 1628, ISP 1626, local network 1622 and communication interface 1618.

The received code may be executed by processor 1604 as it is received, and/or stored in storage device 1610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, wherein processing of the instructions by one or more processors, cause:
   receiving, at a multi-function peripheral Web application from a multi-function peripheral device, user identification data that uniquely identifies a particular user of the multi-function peripheral device;
   receiving, at the multi-function peripheral Web application from an external Web service, an access token for accessing resources of the user at the external Web service without revealing a password of the user for the external Web service;
   storing, by the multi-function peripheral Web application, registration data that maps the user identification data that uniquely identifies the particular user of the multi-function peripheral device to the access token for accessing resources of the user at the external Web service;
   receiving, at the multi-function peripheral Web application from the multi-function peripheral device an object identifier that was read by the multi-function peripheral device from an object that is associated with the user and separate from the multi-function peripheral device;
   identifying, based on the object identifier, the user identification data and the access token for accessing resources of the user at the external Web service;
   requesting, by the multi-function peripheral Web application from the external Web service using the access token, access to one or more resources of the user at the external Web service; and
   receiving the one or more resources at the multi-function peripheral Web application from the external Web service.

2. The one or more non-transitory computer-readable media of claim 1, wherein the external Web service is a first external Web service that is registered with the multi-function peripheral Web application and the access token is a first access token;
   wherein the instructions further cause:
   receiving, at the multi-function peripheral Web application from a second external Web service, a second access token for accessing resources of the user at the second external Web service without revealing a second password of the user for the second external Web service;
   wherein the second access token is different than the first access token and the second external Web service is different than the first external Web service;
   storing, by the multi-function peripheral Web application, registration data that maps the user identification data that uniquely identifies the particular user of the multi-function peripheral device to the second access token for accessing resources of the user at the second external Web service.

3. The one or more non-transitory computer-readable media of claim 1, wherein the instructions further cause:
   receiving, at the multi-function peripheral Web application from the multi-function peripheral device, selection data that selects the external Web service from a plurality of external Web services registered with the multi-function peripheral Web application;
   selecting the access token from a plurality of access tokens that are mapped to the object identifier based on the selection data.

4. The one or more non-transitory computer-readable media of claim 1, wherein the registration data maps the object identifier to a plurality of access tokens for a plurality of different external Web services; wherein the multi-function peripheral Web application uses different access tokens to accesses different respective external Web services for the particular user of the multi-function peripheral device.

5. The one or more non-transitory computer-readable media of claim 1, wherein the registration data maps the object identifier to a plurality of access tokens for a plurality of different external Web services; wherein the instructions further cause the multi-function peripheral Web application uses different access tokens to accesses different respective resources from different respective external Web services for the particular user of the multi-function peripheral device.

6. The one or more non-transitory computer-readable media of claim 5, wherein the multi-function peripheral Web application uses different access tokens to accesses different respective resources from different respective external Web services for the particular user of the multi-function peripheral device in response to a single read of the object by the multi-function peripheral device.

7. The one or more non-transitory computer-readable media of claim 5, wherein the multi-function peripheral Web application requires separate reads of the object by the multi-function peripheral device to access different respective external Web services for the particular user of the multi-function peripheral device.

8. The one or more non-transitory computer-readable media of claim 1, wherein the object is one of a radio-frequency identification (RFID) object or a smartcard.

9. A system comprising:
   one or more processors;
   one or more non-transitory computer-readable media storing instructions, wherein processing of the instructions by one or more processors, cause:
   receiving, at a multi-function peripheral Web application from a multi-function peripheral device, user identification data that uniquely identifies a particular user of the multi-function peripheral device;
   receiving, at the multi-function peripheral Web application from an external Web service, an access token for accessing resources of the user at the external Web service without revealing a password of the user for the external Web service;
   storing, by the multi-function peripheral Web application, registration data that maps the user identification data that uniquely identifies the particular user of the multi-function peripheral device to the access token for accessing resources of the user at the external Web service;
   receiving, at the multi-function peripheral Web application from the multi-function peripheral device an object identifier that was read by the multi-function peripheral device from an object that is associated with the user and separate from the multi-function peripheral device;

identifying, based on the object identifier, the user identification data and the access token for accessing resources of the user at the external Web service;

requesting, by the multi-function peripheral Web application from the external Web service using the access token, access to one or more resources of the user at the external Web service; and receiving the one or more resources at the multi-function peripheral Web application from the external Web service.

10. The system of claim 9, wherein the external Web service is a first external Web service that is registered with the multi-function peripheral Web application and the access token is a first access token; wherein the instructions further cause:

receiving, at the multi-function peripheral Web application from a second external Web service, a second access token for accessing resources of the user at the second external Web service without revealing a second password of the user for the second external Web service;

wherein the second access token is different than the first access token and the second external Web service is different than the first external Web service;

storing, by the multi-function peripheral Web application, registration data that maps the user identification data that uniquely identifies the particular user of the multi-function peripheral device to the second access token for accessing resources of the user at the second external Web service.

11. The system of claim 9, wherein the instructions further cause:

receiving, at the multi-function peripheral Web application from the multi-function peripheral device, selection data that selects the external Web service from a plurality of external Web services registered with the multi-function peripheral Web application;

selecting the access token from a plurality of access tokens that are mapped to the object identifier based on the selection data.

12. The system of claim 9, wherein the registration data maps the object identifier to a plurality of access tokens for a plurality of different external Web services; wherein the multi-function peripheral Web application uses different access tokens to accesses different respective external Web services for the particular user of the multi-function peripheral device.

13. The system of claim 9, wherein the registration data maps the object identifier to a plurality of access tokens for a plurality of different external Web services; wherein the instructions further cause the multi-function peripheral Web application uses different access tokens to accesses different respective resources from different respective external Web services for the particular user of the multi-function peripheral device.

14. The system of claim 13, wherein the multi-function peripheral Web application uses different access tokens to accesses different respective resources from different respective external Web services for the particular user of the multi-function peripheral device in response to a single read of the object by the multi-function peripheral device.

15. The system of claim 13, wherein the multi-function peripheral Web application requires separate reads of the object by the multi-function peripheral device to access different respective external Web services for the particular user of the multi-function peripheral device.

16. The system of claim 9, wherein the object is one of a radio-frequency identification (RFID) object or a smartcard.

17. A method comprising:

receiving, at a multi-function peripheral Web application from a multi-function peripheral device, user identification data that uniquely identifies a particular user of the multi-function peripheral device;

receiving, at the multi-function peripheral Web application from an external Web service, an access token for accessing resources of the user at the external Web service without revealing a password of the user for the external Web service;

storing, by the multi-function peripheral Web application, registration data that maps the user identification data that uniquely identifies the particular user of the multi-function peripheral device to the access token for accessing resources of the user at the external Web service;

receiving, at the multi-function peripheral Web application from the multi-function peripheral device an object identifier that was read by the multi-function peripheral device from an object that is associated with the user and separate from the multi-function peripheral device;

identifying, based on the object identifier, the user identification data and the access token for accessing resources of the user at the external Web service;

requesting, by the multi-function peripheral Web application from the external Web service using the access token, access to one or more resources of the user at the external Web service; and receiving the one or more resources at the multi-function peripheral Web application from the external Web service.

18. The method of claim 17, wherein the external Web service is a first external Web service that is registered with the multi-function peripheral Web application and the access token is a first access token; the method further comprising:

receiving, at the multi-function peripheral Web application from a second external Web service, a second access token for accessing resources of the user at the second external Web service without revealing a second password of the user for the second external Web service;

wherein the second access token is different than the first access token and the second external Web service is different than the first external Web service;

storing, by the multi-function peripheral Web application, registration data that maps the user identification data that uniquely identifies the particular user of the multi-function peripheral device to the second access token for accessing resources of the user at the second external Web service.

19. The method of claim 17, further comprising:

receiving, at the multi-function peripheral Web application from the multi-function peripheral device, selection data that selects the external Web service from a plurality of external Web services registered with the multi-function peripheral Web application;

selecting the access token from a plurality of access tokens that are mapped to the object identifier based on the selection data.

20. The method of claim 17, wherein the registration data maps the object identifier to a plurality of access tokens for a plurality of different external Web services; wherein the multi-function peripheral Web application uses different access tokens to accesses different respective external Web services for the particular user of the multi-function peripheral device.

* * * * *